(12) United States Patent
Anderson et al.

(10) Patent No.: US 7,205,794 B2
(45) Date of Patent: Apr. 17, 2007

(54) MICROPROCESSOR RESISTANT TO POWER ANALYSIS

(76) Inventors: Ross John Anderson, 10 Water End, Wrestlingworth, Sandy, Bedfordshire SG19 2HA (GB); Simon William Moore, 19 Bourne Road, Chesterton, Cambridgeshire CB2 3QG (GB)

( * ) Notice: Subject to any disclaimer, the term of this patent is extended or adjusted under 35 U.S.C. 154(b) by 912 days.

(21) Appl. No.: 10/182,418

(22) PCT Filed: Jan. 26, 2001

(86) PCT No.: PCT/GB01/00311

§ 371 (c)(1),
(2), (4) Date: Sep. 27, 2002

(87) PCT Pub. No.: WO01/55821

PCT Pub. Date: Aug. 2, 2001

(65) Prior Publication Data

US 2003/0084336 A1 May 1, 2003

(30) Foreign Application Priority Data

Jan. 28, 2000 (GB) .................................. 0001954.7

(51) Int. Cl.
*H03K 19/20* (2006.01)
(52) U.S. Cl. .......................................... 326/104; 326/8
(58) Field of Classification Search .................. 326/8, 326/37, 38, 121; 726/22–24
See application file for complete search history.

(56) References Cited

U.S. PATENT DOCUMENTS

| | | | |
|---|---|---|---|
| 4,439,835 A | 3/1984 | Best et al. | |
| 4,513,389 A | 4/1985 | Devchoudhury | |
| 4,539,682 A | 9/1985 | Herman et al. | |
| 4,783,801 A | 11/1988 | Kaule | |
| 4,881,199 A | 11/1989 | Kowalski | |
| 4,932,053 A | 6/1990 | Fruhauf et al. | |

(Continued)

FOREIGN PATENT DOCUMENTS

GB    2333883    8/1999

(Continued)

OTHER PUBLICATIONS

I. David et al., "An Efficient Implementation of Boolean Functions as Self-Timed Circuits," IEEE Transactions on Computers, vol. 41, No. 1, pp. 2-11, 1992, no month.

(Continued)

*Primary Examiner*—Don Le
(74) *Attorney, Agent, or Firm*—Dann, Dorfman, Herrell and Skillman, P.C.

(57) ABSTRACT

A secure microprocessor is designed using quad-coded logic which is similar to dual-rail encoded asynchronous logic except that the '11' state propagates an alarm. The alarm signal obliterates secure data in its path. Quad-coded logic provides resilience to power glitches and single-transistor or single-wire failures. The already low data dependency of the power consumption makes power analysis attacks difficult, and they are made even more difficult by inserting random delays in data and control paths, and by a set-random-carry instruction which enables software to make a non-deterministic choice between equivalent instruction sequences. These features are particularly easy to implement well in quad-coded logic.

18 Claims, 3 Drawing Sheets

U.S. PATENT DOCUMENTS

| | | | | |
|---|---|---|---|---|
| 5,083,106 | A | * | 1/1992 | Kostusiak et al. ............ 340/506 |
| 5,208,489 | A | * | 5/1993 | Houston ....................... 326/98 |
| 5,404,402 | A | | 4/1995 | Sprunk |
| 5,493,240 | A | | 2/1996 | Frank |
| 2004/0228190 | A1 | * | 11/2004 | Kunemund et al. .......... 365/202 |
| 2005/0141295 | A1 | * | 6/2005 | Laackmann ................. 365/194 |
| 2005/0270061 | A1 | * | 12/2005 | Otterstedt .................... 326/38 |
| 2005/0273631 | A1 | * | 12/2005 | Shu et al. .................... 713/190 |

FOREIGN PATENT DOCUMENTS

| | | |
|---|---|---|
| WO | 9963696 | 12/1999 |

OTHER PUBLICATIONS

R. Anderson et al., "Tamper Resistance—A Cautionary Note," The Sec. USENIX Workshop on Electronic Commerce, Oakland, CA, Nov. 18-21, 1996; Proceedings pp. 1-11, ISBN 1-880446-83-9.

R. Anderson et al., "Low Cost Attacks on Tamper Resistant Devices," in M. Lomas et al. (ed.): Security Protocols, 5$^{th}$ Intl. Workshop, Paris, France, Apr. 7-9, 1997, Proceedings, Springer LNCS v 1361, pp. 125-136, ISBN 3-540-64040-1.

S. Chari et al., "A Cautionary Note Regarding Evaluation of AES Candidates on Smart-Cards," Sec. Ad. Encryption Standard Candidate Conf., Mar. 22-23, 1999, proceedings published by NIST, pp. 133-147.

P. Kocher, "Timing Attacks on Implementations of Diffie-Hellman, RSA, DSS, and Other Systems," Adv. in Cryptology—Crypto 96, Aug. 18-22, 1996, Proceedings, Springer LNCS v 1109, pp. 104-113.

P. Kocher et al., "Differential Power Analysis," Advances in Cryptology—Crypto 99, Proceedings Springer LNCS, 1999, no month.

O. Kömmerling et al., "Design Priniciples for Tamper-Resistant Smartcard Processors," USENIX Workshop on Smartcard Technology, Chicago, IL, USA, May 10-11, 1999.

T. Messerges et al., "Investigations of Power Analysis Attacks on Smartcards," Proceedings of USENIX Workshop on Smartcard Technology, May 1999, pp. 151-161.

* cited by examiner

US 7,205,794 B2

MICROPROCESSOR RESISTANT TO POWER ANALYSIS

This application is a 371 of PCT/GB01/00311 Jan. 26, 2001.

TECHNICAL FIELD

This invention is related to the protection of confidential electronic data against eaves-droppers who try to reconstruct it from the electromagnetic emissions on power wires.

BACKGROUND OF THE INVENTION

Smartcards, and other electronic devices used for security purposes, are vulnerable to analysis of power consumption in order to extract secret data [4, 5, 12, 14]. This technique, known as power analysis, can reveal a lot of information about the work being done by the electronics, including the Hamming weights of signal transitions on the buses and the instructions being executed. If circuits consume power in relation to the data values being processed then the power signature contains secret data in an encoded form. Given the algorithm being computed by a microprocessor or other secure device, the eavesdropper can construct a set of input stimuli to obtain a corresponding set of power traces which can be used to extract the secret information [8].

A related threat to smartcard systems is direct physical attack. The card's packaging is removed and the signals on the bus, or elsewhere in the processor, are read out using microprobes [9]. This step is typically used against some samples of the card to extract the card's software; once this has been done, an attack using power analysis can be devised which will work against other cards of the same type without the need to depackage them. A particularly grave threat is that such an attack might be implemented in a seemingly innocuous terminal, in which members of the public might insert smartcards issued by a bank or government in order to obtain some low cost service. For example, a criminal gang might set up a market stall and sell goods, but with the real intention of obtaining cardholders' private or secret keys and thus forging smartcards which would later be used to loot their accounts or impersonate them for welfare and other claims.

Another threat to smartcard systems is fault induction. Faults can be induced in a number of ways, such as by introducing transients ('glitches') on the power and clock lines [14, 1]. These may cause the processor to malfunction in a predictable and useful way. Another attack technique, used in the context of an invasive microprobing attack, is to use a laser to shoot away alarm circuitry, or protective circuitry such as access control matrices which only allow certain areas of memory to be accessed following the presentation of certain passwords [9]. In order to ensure that the failure of a single circuit element (such as a wire or transistor) cannot cause secret data to be leaked, some manufacturers of defence electronic equipment use two-wire logic, that is, logic in which each state is carried on two wires with '01' meaning '0' and '10' meaning '1'. To date, such circuits appear to have used clocked rather than self-timed logic. As well as measuring the current drawn by the secure device, an attacker can also measure the time taken for a cryptographic or other computation to execute [6]. We will consider this to be a special case of power analysis.

Existing defensive technology includes randomised internal clock generators to deny precise timing information to an attacker [14], incorporating a number of oscillators and/or noise generators to provide masking signals, physical chip coatings to make probing more difficult, sensor grids in the top metal layer of the chip which may be broken during probing attacks and activate alarms [9], and mechanisms whereby a random input may be used to make a processor execute equivalent sequences of instruction cycles, or insert nulls (no-ops) into the instruction execution sequence [10.]

A secure device must therefore be protected in a number of ways. Noninvasive attacks based on power analysis must be made difficult, and to hinder attacks based on some combination of probing out the contents of a chip, inducing faults (whether by applied glitches or by invasive destructive methods such as laser shots), and power analysis, the circuit must also be highly resistant to electromagnetic transients while being able to propagate alarms quickly in the event of an attack being detected. This combination of robustness and fragility has been very hard to achieve with existing silicon technology.

SUMMARY OF THE INVENTION

According to the current invention there is provided a microprocessor with reduced data dependent power signature, resilience against single-element faults, and an efficient alarm mechanism to propagate alarms through the chip quickly and thus make algorithm extraction via probing more difficult. It also uses asynchronous circuitry which decouples the internal execution from the device external interface. The techniques in our invention apply without loss of generality to security processors which are not microprocessors, such as dedicated encryption chips and modules which contain more than one chip (e.g., separate processor, cryptographic chip and RAM in a single package).

Our invention is adapted from dual-rail encoded asynchronous logic because in this technology, the power consumed can be made substantially independent of the data being processed, and by the choice of suitable design rules, which should be clear to those skilled in the art, the design can be made resistant to single-transistor and single-wire faults. Furthermore, such circuits are already known to be highly resilient to variations in the applied power supply voltage. In our invention, alarms resulting from environmental sensors or from the activation of other protective mechanisms can be propagated rapidly through the chip using many independent paths.

DETAILED DESCRIPTION

We define 'quad-coded data' as follows. We use two wires to represent every logical bit. This is similar to dual-rail (sometimes called double-rail) encoded data [15] used in speed independent circuit design, except that we use the fourth state to propagate an alarm signal (see FIG. 1). Obviously the binary encodings and their assigned meanings may be permuted to suit the requirements of a particular implementation, but for clarity we will illustrate our design using just this encoding.

TABLE 1 two wire data encoding schemes

| traditional dual-rail encoding | | | quad-coded data | | |
|---|---|---|---|---|---|
| A1 | A0 | meaning | A1 | A0 | meaning |
| 0 | 0 | clear (or "undefined") | 0 | 0 | clear |
| 0 | 1 | logical 0 | 0 | 1 | logical 0 |
| 1 | 0 | logical 1 | 1 | 0 | logical 1 |
| 1 | 1 | not used | 1 | 1 | alarm |

A processor pipeline with a quad-coded data-path may be constructed using well known dual-rail pipelining techniques [3]. Alarm signals can be inserted using an OR function of the data and with a sense signal from a sensor (see FIG. 1). One sensor in our invention is based on an instruction counter; the processor software can check that the expected number of instructions have been executed and alarm if this is riot the case (as might happen, for example, under destructive probing attack). In the single circuit implementing the instruction by which this alarm is executed, we depart from the quad-coded logic rules described herein so that an alarm hardware state may be generated from a non-alarm hardware state. Other sensors are outside the scope of this patent but may typically be designed to detect out-of-bounds environmental parameters such as over- and under-voltage and low temperature. This OR function can be combined with the combinational function indicated to assist the usual gate minimisation process.

Once an alarm signal has been injected into the data-path it obliterates the data in the pipeline since any dyadic function of a valid logic level ($01_2$ or $10_2$) with an alarm signal ($11_2$) will result in an alarm signal.

Logical inversion (NOT) of quad-coded data requires no gates—the wires just have to be swapped. Thus, a quad-coded NOT function has no overhead. Further, inverting an alarm signal ($11_2$) outputs an alarm signal.

Figure 2:
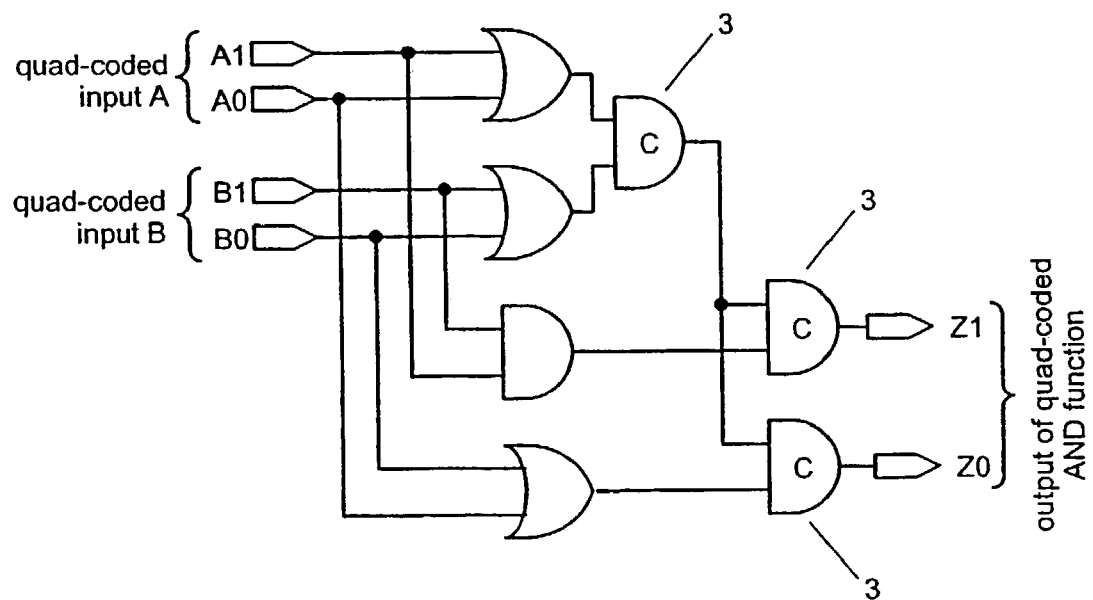
FIG. 2 is dual-rail AND gate which employs C-elements [11] to ensure that the outputs (Z0 and Z1) only change state after the inputs (A0, A1, B0 and B1) have stabilised.

It is well known that logic functions AND, NAND, OR and NOR can all be constructed from one AND gate plus NOT functions using de Morgan's law. Since NOT functions propagate alarm signals, we just have to demonstrate that a quad-coded AND gate also propagates alarm signals. The circuit for a quad-coded AND gate is illustrated in FIG. 2 and it can be seen that if one or both inputs are alarm signals then the result will be an alarm signal. XOR and XNOR functions can be constructed from NAND gates in the usual manner.

Functions of more than two inputs can be constructed from these two input functions, though more efficient versions which still propagate the alarm signal correctly are easy to define.

Figure 1:
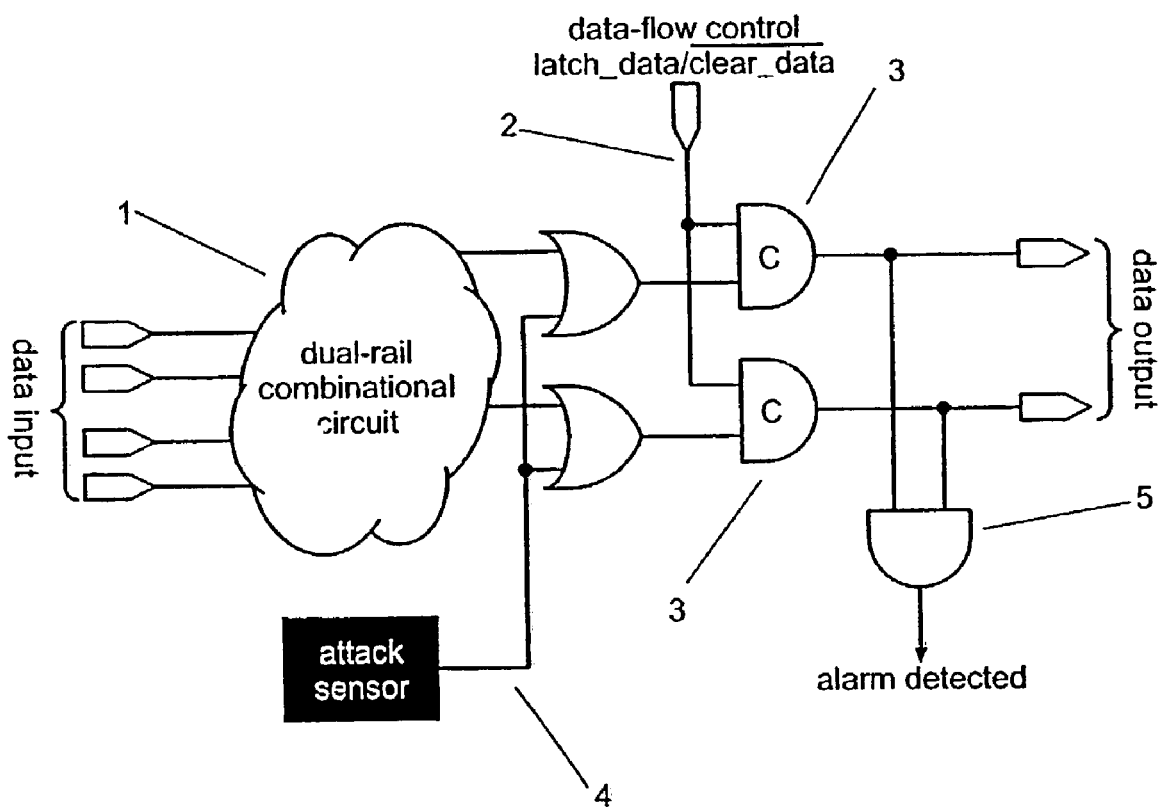
FIG. 1 presents an abstraction of a quad-coded data-path.

To ensure that alarm signals are propagated as quickly as possible, there are places in the chip where additional circuitry is used to detect the presence of an alarm (using an AND gate (5) in FIG. 1) and then injecting that signal into another circuit as though it had originated from an attack sensor. The placement of these alarm propagators can be worked out by someone skilled in the microprobing art as described in [9].

As discussed in the previous section, quad-coded NOT functions are implemented by swapping wires; no gates are required and so no power is consumed. Other functions can be constructed from quad-coded AND gates + quad-NOT functions. The AND gate of FIG. 2 consumes the same amount of power regardless of the logical values on the inputs to the gates. It follows that the power consumed during a computation will be largely independent of the data being processed.

The most notable exception will be when data values affect the control flow. For example, when computing a digital signature the critical computation is often $x^y$ modulo n, where y is the secret value. As exponentiation is implemented using repeated squaring and doubling, depending on whether the bits in the binary expansion of y are zero or 1, an opponent who can tell the difference between squaring and doubling by studying the chip's power consumption can deduce the secret value y. However, given a processor of sufficient performance, this residual vulnerability can be dealt with using defensive programming techniques, such as computing both the squaring and the doubling operation at each step and copying only the desired one of the two results to the next stage of the computation. Self timed logic has the potential for substantially better performance than clocked logic in a smartcard environment, as the speed of the computation is limited only by the underlying silicon process rather than the externally supplied clock.

Figure 3:
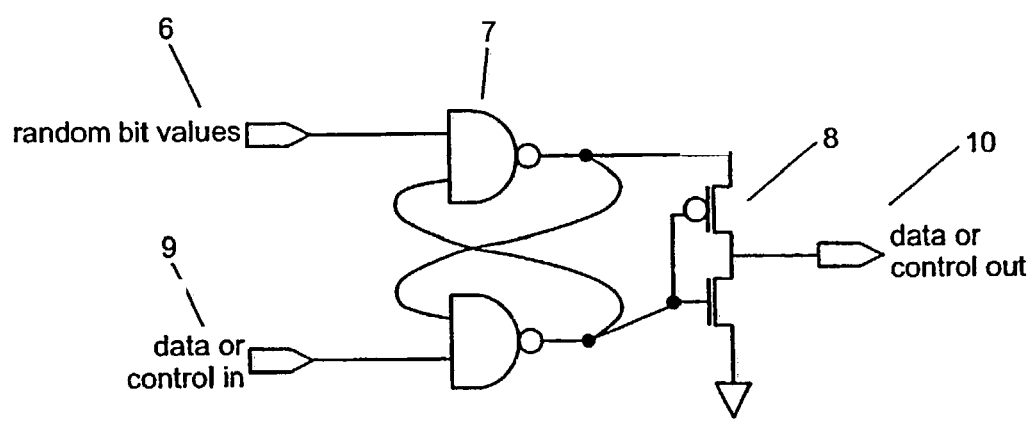
FIG. 3 illustrates a circuit for introducing random delays to an data or control signal using a random delay source producing a random bit sequence. The output filter is based upon an asynchronous arbiter designed by Seitz [13]
Figure 4:
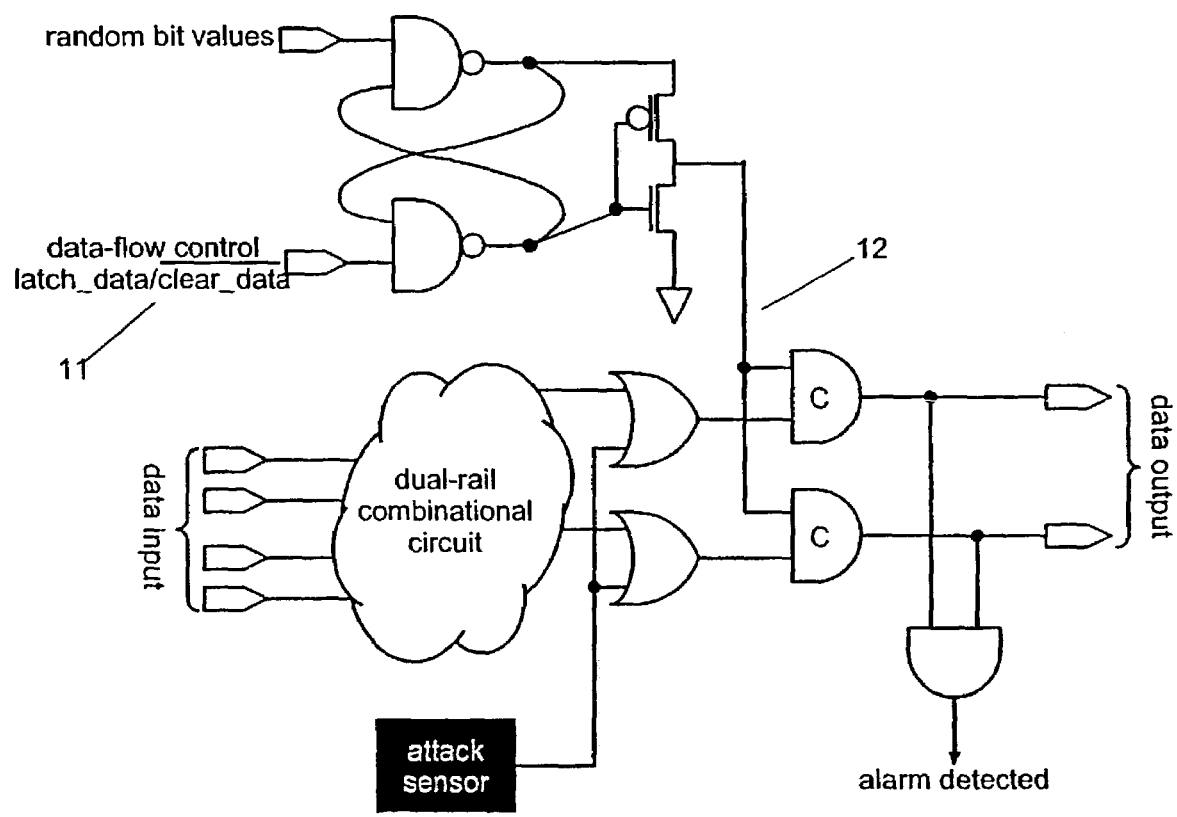
FIG. 4 illustrates how the random delay element of FIG. 3 may be inserted into the circuit of FIG. 1. The data-flow control signal (11) is fed into the random delay circuit (of FIG. 3 and the output is fed into the alarm circuit (or FIG. 1) at point (12) where the data-flow control signal was originally inserted.

The quad-coded circuits and defensive programming technique described so far will reduce the data dependent power usage. However, data dependent timing behaviour may be visible. To counteract this effect, additional random delays are added to the data path and control path. This is possible because these circuits are speed independent. The effect is far more subtle than known clocked equivalents which slow the device by a whole clock period which is a predictable unit of time [7]. Random delays in the data-path or the control-path may be inserted using a the circuit in FIG. 3. A standard pseudo random number generator may be used to provide the random bit values (6). Data or control signals are fed in at (9). Contention between the random bit values and input (9) may cause the RS flip-flop (7) to go metastable but the filter (8) will prevent this metastable signal from propagating to the data/control output (10). The time it takes for the flip-flop to stabilise is non-deterministic and adds further randomness to the timing of the circuit.

Finally, in order to support the use of software defensive measures which can further reduce the intelligibility of any residual data dependent power signal, our microprocessor has an additional instruction: set-random-carry. This supports the idea in [10] whereby a random choice is made between two equivalent but different sequences of instructions. The processor can jump to the two sequences using branch-carry-set and branch-carry-clear instructions. The implementation of the set-random-carry instruction is greatly facilitated by the use of quad-coded logic because a free running pseudo-random number generator based on a shift register (or without loss of generality and oscillator) produces pseudo-random bits with a timing independent of the processor instruction execution, and this bit stream is sampled when the set-random-carry instruction is executed.

REFERENCES

[1] Ross J. Anderson, Markus G. Kuhn: Tamper Resistance—a Cautionary Note, The Second USENIX Workshop on Electronic Commerce, Oakland, Calif., Nov. 18–21, 1996; Proceedings pp 1–11, ISBN 1-880446-83-9.
[2] Ross J. Anderson, Markus G. Kuhn: Low Cost Attacks on Tamper Resistant Devices, in M. Lomas et al. (ed.): Security Protocols, 5th International Workshop, Paris, France, Apr. 7–9, 1997, Proceedings, Springer LNCS v 1361, pp 125–136, ISBN 3-540-64040-1.
[3] I. David, R. Ginosar and M. Yoeli: An efficient implementation of boolean functions as self-timed circuits, IEEE Transactions on Computers, Vol 41, No 1, pp 2–11, 1992.
[4] Serge Fruhauf, Laurent Sourgen: Safety device against the unauthorised detection of protected data, U.S. Pat. No. 4,932,053, Jun. 5, 1990
[5] Suresh Chari, Charanjit Jutla, Josyula R Rao, Pankaj Rohatgi: A Cautionary Note Regarding Evaluation of AES Candidates in Smart-Cards, Second Advanced Encryption Standard Candidate Conference, Mar. 22–23, 1999, proceedings published by NIST, pp 133–147
[6] Paul Kocher: Timing Attacks on Implementations of Diffie-Hellman, RSA, DSS, and Other Systems, Advances in Cryptology—Crypto 96, Aug. 18–22, 1996, Proceedings, Springer LNCS v 1109 pp 104–113
[7] Paul Kocher, Joshua Jaffe, Benjamin Jun: Using unpredictable information to minimize leakage from smartcards and other cryptosystems, International patent application WO99/63696 (Dec. 9, 1999)
[8] Paul Kocher, Joshua Jaffe, Benjamin Jun: Differential Power Analysis, Advances in Cryptology—Crypto 99, Proceedings, Springer LNCS
[9] Oliver Kömmerling, Markus G. Kuhn: Design Principles for Tamper-Resistant Smartcard Processors, USENIX Workshop on Smartcard Technology, Chicago, Ill., USA, May 10–11, 1999
[10] Markus G. Kuhn, Ross J. Anderson: Low Cost Countermeasures Against Compromising Electromagnetic Computer Emanations, UK patent application 9801745.2. (28 Jan. 1998)
[11] R. E. Miller: Sequential Circuits, Chapter 10, In Switching Theory, Volume 2, Wiley, N.Y., 1965.
[12] Thomas S Messerges, Ezzy A Dabish, Robert H Sloan: Investigations of Power Analysis Attacks on Smartcards, Proceedings of USENIX Workshop on Smartcard technology, May 1999, pp 151–161
[13] C. L. Seitz: System Timing, in Introduction to VLSI Systems, edited by C. A. Mead and L. Conway, Addison-Wesley, 1992.
[14] Eric Sprunk, Clock Frequency Modulation for Secure Microprocessors, U.S. Pat. No. 5,404,402
[15] Stephen H Unger: Asynchronous Sequential Switching Circuits, Wiley-Interscience, 1969.

The above references are incorporated herein by reference.

The invention claimed is:

1. A logical circuit comprising at least one logical function and at least one connector connected to said logical function, wherein: said at least one connector has two wires for each logical connection, such that each wire has two logical states being a low logical state and a high logical state, thereby to define four logical signals of said conductor, characterised in that: the circuit further comprises at least one attack sensor, said attack sensor being arranged so as to produce a normal signal at all times except when an attack is detected, when an attack signal is produced; a first one of said low logical signals is an alarm signal, a second one is a low logical signal, a third one is a high logical signal, and a fourth is a clear signal; on the or one of said connectors, each of said wires is connected to the input of a separate logical gate, the other input of each of said logical gates is connected to the attack sensor, the output of said logical gates being the continuation of said connector; and said logical gates being constructed so as to propagate the logical states of said wires when the input signal from the attack sensor is a normal signal and to propagate an alarm signal when the input signal from the attack sensor is an attack signal, regardless of the input from said wires.

2. A logical circuit according to claim 1, wherein said alarm signal is represented by the same logical state on both of said wires, said low logical signal is represented by a low logical state on the first of said wires and a high logical state on the second of said wires, and said high logical signal is represented by a high logical state on the first of said wires and a low logical state on the second of said wires.

3. A logical circuit according to claim 2, wherein said alarm signal is represented by a high logical state on both of said wires.

4. A logical circuit according to claim 1, wherein said logical gates are OR gates and said attack sensor is arranged so as to normally produce a low logical signal to said OR gates and produce a high logical signal to said OR gates when an attack is detected.

5. A logical circuit according to claim 1, further comprising additional logical functions which are arranged to detect the existence of an alarm state.

6. A logical circuit according to claim 5, wherein said additional logical functions act as attack sensors for other parts of said circuit.

7. A logical circuit according to claim 1, wherein on at least one of said connectors, each of said wires is connected to the input of a further logical gate, the other input of each of said further logical gates is connected to a control input, the output of said further logical gates being the continuation of said connector, and said further logical gates are arranged so that the propagation of data along said connector is controlled by the control input.

8. A logical circuit according to claim 7, wherein said further logical gates are Muller C-elements.

9. A logical circuit according to claim 7, wherein said delay circuit comprises an RS flip-flop and a filter, the inputs to said flip-flop being a random generator and a control input, the outputs of said flip-flop being connected to said filter, and the output of said filter forming said control input to the logical circuit, said filter being arranged so as to prevent a metastable state of the flip-flop being output.

10. An alarm-propagating logical AND gate capable of receiving two four-valued logical signals as inputs and outputting a four-valued logical signal according to said inputs, wherein said AND gate is adapted for use in a logical circuit where each four-valued logical signal is represented by the logical state of two wires, such that each wire has two states being a low logical state and a high logical state; a first one of said four values of each logical signal is an alarm signal, a second one is a low logical signal, a third one is a high logical signal and a fourth is a clear signal; and said AND gate is constructed from standard logical gates so as to output a high logical signal when both of said inputs are high logical signals, to output a low logical signal when one of said inputs is a low logical signal and the other input is either a low or a high logical signal, and to output an alarm signal if either of said inputs is an alarm signal, regardless of the other input.

11. A logical AND gate according to claim 10, wherein said low logical signal is represented by a low logical state on the first of said wires and a high logical state on the second of said wires, said high logical signal is represented by a high logical state on the first of said wires and a low logical state on the second of said; wires, and said alarm signal is represented by the same logical state on both of said wires.

12. A logical AND gate according to claim 11, wherein said alarm signal is represented by a high logical state on both of said wires.

13. A method of propagating signals in a logical circuit wherein each logical, signal is represented by two logical states, carried on separate wires, said two logical states being a low logical state and a high logical state, thereby to define four logical signals, characterised in that: a first one of said logical signals is an alarm signal, a second one is a low logical state, a third one is a high logical state and a fourth is a clear signal; said low logical signal is represented by a low logical state on the first of said wires and a high logical state on the second of said wires, said high logical signal is represented by a high logical state on the first of said wires and a low logical state on the second of said wires and said alarm signal is represented by the same logical state on both wires; and dyadic combining of said alarm signal with any of other said signals results in the propagation of an alarm signal.

14. A method of propagating signals in a logical circuit according to claim 13, wherein said alarm signal is represented by a high logical state on both of said wires.

15. A method of protecting the data and operation of a secure electronic device wherein the logical signals within the circuitry are propagated according to the methods of claim 13, comprising the steps of: detecting an attack with an attack sensor; causing an alarm signal to be set in at least one part of the device; propagating said alarm signal throughout the device to erase any secret data being processed by the device.

16. A logical circuit comprising at least one logical function and at least one connector connected to said logical function wherein:
    said at least one connector has two wires for each logical connection, such that each wire has two logical states being a low logical state and a high logical state, thereby to define four logical signals of said connector, characterised in that:
    the circuit further comprises at least one attack sensor, said attack sensor being arranged so as to produce a normal signal at all times except when an attack is detected, at which time an attack signal is produced by the attack sensor;
    a first one of said low logical signals is an alarm signal, a second one is a low logical signal, and a third one is a high logical signal;
    on the or one of said connectors, each of said wires is connected to the input of a separate logical gate, the other input of each of said logical gates is connected to the attack sensor, the output of said logical gates being the continuation of said connector; and
    said logical gates being constructed so as to propagate the logical states of said wires when the input signal from the attack sensor is a normal signal and to propagate an alarm signal when the input signal from the attack sensor is an attack signal, regardless of the input from said wires.

17. An alarm-propagating logical AND gate capable of receiving two four-valued logical signals as inputs and outputting a four-valued logical signal according to said inputs, wherein
    said AND gate is adapted for use in a logical circuit where each four-valued logical signal is represented by the logical state of two wires, such that each wire has two states being a low logical state and a high logical state;
    a first one of said four values of each logical signal is an alarm signal, a second one is a low logical signal, and a third one is a high logical signal; and
    said AND gate is constructed from standard logical gates so as to output a high logical signal when both of said inputs are high logical signals, to output a low logical signal when one of said inputs is a low logical signal and the other input is either a low or a high logical signal, and to output an alarm signal if either of said inputs is an alarm signal, regardless of the other input.

18. A method of propagating signals in a logical circuit wherein each logical signal is represented by two logical states, carried on separate wires, said two logical states being a low logical state and a high logical state, thereby to define four logical signals,
    characterised in that:
    a first one of said logical signals is an alarm signal, a second one is a low logical state, and a third one is a high logical state;
    said low logical signal is represented by a low logical state on the first of said wires and a high logical state on the second of said wires, said high logical signal is represented by a high logical state on the first of said wires and a low logical state on the second of said wires and said alarm signal is represented by the same logical state on both wires; and
    dyadic combining of said alarm signal with any of the other said signals results in the propagation of an alarm signal.

* * * * *